(12) United States Patent
Xu et al.

(10) Patent No.: US 8,632,918 B2
(45) Date of Patent: Jan. 21, 2014

(54) ELECTROLYTE FORMULATIONS FOR WIDE TEMPERATURE LITHIUM ION BATTERIES

(75) Inventors: Kang Xu, North Potomac, MD (US); Shengshui Zhang, Olney, MD (US); T. Richard Jow, Potomac, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 1192 days.

(21) Appl. No.: 11/345,677

(22) Filed: Feb. 1, 2006

(65) Prior Publication Data

US 2010/0129721 A1 May 27, 2010

Related U.S. Application Data

(60) Provisional application No. 60/650,001, filed on Feb. 3, 2005.

(51) Int. Cl.
  *H01M 6/16* (2006.01)
  *H01M 6/04* (2006.01)
  *H01M 4/13* (2010.01)
  *H01M 4/58* (2010.01)
  *H01M 4/00* (2006.01)
  *H01M 4/50* (2010.01)

(52) U.S. Cl.
  USPC ........ 429/337; 429/199; 429/218.1; 429/221; 429/223; 429/224; 429/231.95; 429/332; 429/339; 429/340

(58) Field of Classification Search
  USPC ........ 429/337, 218.1, 221, 223, 224, 231.95, 429/339, 340, 199, 332
  See application file for complete search history.

(56) References Cited

U.S. PATENT DOCUMENTS

| | | | |
|---|---|---|---|
| 5,525,443 A | 6/1996 | Okuno et al. | |
| 6,475,680 B1 | 11/2002 | Arai et al. | |
| 6,492,064 B1 | 12/2002 | Smart et al. | |
| 6,503,657 B1 | 1/2003 | Takami et al. | |
| 6,506,516 B1 | 1/2003 | Wietelmann et al. | |
| 6,566,015 B1 | 5/2003 | Yamada et al. | |
| 6,746,799 B2 | 6/2004 | Yamada et al. | |
| 6,908,712 B2 | 6/2005 | Aoshima et al. | |
| 2004/0034253 A1* | 2/2004 | Angell et al. | 568/6 |
| 2004/0043295 A1* | 3/2004 | Rodriguez et al. | 429/303 |
| 2004/0043299 A1* | 3/2004 | Koike et al. | 429/329 |

FOREIGN PATENT DOCUMENTS

DE 198 29 030 C1 10/1999

OTHER PUBLICATIONS

Xu et al. LiBOB as Salt for Lithium-Ion Batteries. Electrochemical and Solid-State Letters 5(1):A26-A29 (2002).
Xu et al. LiBOB and Its Derivatives. Electrochemical and Solid-State Letters 4(1):E1-E4 (2001).
Chagnes et al. Cycling Ability of Gamma-Butyrolactone-Ethylene Carbonate Based Electrolytes. Journal of the Electrochemical Society 150(9):A1255-A1261 (2003).
Takami et al. Laminated Thin Li-Ion Batteries Using a Liquid Electrolyte. Journal of the Electrochemical Society 149(1):A9-A12 (2002).
XU, Chem. Rev. 2004, 104, 4303-4417.

* cited by examiner

*Primary Examiner* — Patrick Ryan
*Assistant Examiner* — Julian Anthony
(74) *Attorney, Agent, or Firm* — Williams V. Adams; Avrom David Spevack; Robert Thompson

(57) ABSTRACT

A non-aqueous rechargeable electrochemical cell includes an electrolyte composition produced through the dissolution of a thermally stable lithium salt in a lactone solvent. The resulting cell has stable performance in a wide temperature range between −40° C. and 80° C. The resulting cell operates across this wide temperature range with a commercially acceptable capacity retention, power loss characteristics, and safety characteristics across this temperature range.

15 Claims, 2 Drawing Sheets

ELECTROLYTE FORMULATIONS FOR WIDE TEMPERATURE LITHIUM ION BATTERIES

RELATED APPLICATION

This application claims priority of U.S. Provisional Patent Application Ser. No. 60/650,001 filed Feb. 3, 2005, which is incorporated herein by reference.

GOVERNMENT INTEREST

The invention described herein may be manufactured, used, and licensed by or for the United States Government.

FIELD OF THE INVENTION

The present invention generally relates to a non-aqueous electrolyte rechargeable electrochemical cell, and particularly to the formulation of non-aqueous electrolyte used in Li ion rechargeable cells to achieve a wide operating temperature range.

BACKGROUND OF THE INVENTION

Rechargeable lithium ion batteries have been commercially available for well over a decade. In spite of the improvements in energy densities and power densities, lithium ion cell technology remains restricted to a narrow temperature range of operation. The electrolyte components ethylene carbonate (EC) and lithium hexafluorophosphate (LiPF$_6$) are responsible for much of the temperature range limitation. As a result, lithium batteries can only deliver the rated capacity and power in a narrow range of −20° C. and +60° C. Below −30° C., lithium cells suffer severe power and energy loss along with the safety risk caused by possible lithium metal deposition; while at temperatures higher than 60° C., the thermal decomposition of LiPF$_6$ causes permanent degradation of the cell and potential safety hazards. These restrictions limit the usage of lithium ion batteries in a variety of harsh environments experienced by electric or hybrid electric vehicles (EV/HEV), military and space missions.

Efforts to lower the low temperature operational limits of Li ion cells have focused on replacing the majority of the high melting EC with high ratios of low melting solvents such as the linear dialkylcarbonates or esters. Exemplary of this effort is U.S. Pat. No. 6,492,064 (Smart et al.). Unfortunately, the cycle life of such modified Li ion cells is compromised at room temperatures. Moreover, the oxidative decomposition of these volatile co-solvents at the charged surface of the cathode accelerates at elevated temperatures, resulting in gas buildup and shortened cell lifetime.

Efforts to raise the high temperature operational limit of Li ion cells include using a thermally stable lithium salt and have been scarce and rarely successful. An example of the use of a thermally stable salt lithium bis(oxalato)borate (LiBOB) is Xu et al., *Electrochemical and Solid-State Letters*, 5 (1), A26 (2002). While Li ion cells having an electrolyte based on LiBOB and carbonate mixtures such as EC/dimethylene carbonate (DMC) or EC/propylene carbonate (PC)/DMC can stably cycle at temperatures as high as 70° C., such cells do suffer from lower power and diminished low temperature performance.

Another example for the effort to improve the stability of electrolytes at high temperature is shown by Takami et al., who taught an electrolyte including LiBF$_4$ dissolved in a gamma-butyrolactone (GBL) reduces the gas production within a lithium ion cell when the cell is stored at high temperatures. However, such cells also suffer from lower power and diminished low temperature performance. The cycling performance of these lithium ion cells deteriorates rapidly at high temperatures, caused by the presence of labile fluorines in the anion BF$_4^−$. (Takami et al., *J. Electrochem. Soc.*, 149, A9 (2002)). The electrolyte combination of GBL with LiPF$_6$ also fails to deliver good performances in lithium ion cells even at room temperature, due to the low stability of the electrolyte on anodic graphite. (Chagnes et al., *J. Electrochem. Soc.*, 150, A1255 (2003)).

Currently, no electrolyte composition is available which can simultaneously support the stable operation of Li ion cells at both high and low temperatures. Thus, there exists a need for an electrolyte composition that can simultaneously support the operation of Li ion cells above 60° C. and below −30° C. without serious degradations in cycle life, energy and power.

SUMMARY OF THE INVENTION

A non-aqueous rechargeable electrochemical cell includes an electrolyte composition produced through the dissolution of a thermally stable lithium salt in a lactone solvent. The resulting cell has stable performance in a wide temperature range between −40° C. and 80° C. The resulting cell operates across this wide temperature range with a commercially acceptable capacity retention, power loss characteristics, and safety characteristics across this temperature range.

The non-aqueous rechargeable electrochemical cell includes a positive electrode, a negative electrode, and a separator interposed between the positive electrode and the negative electrode. A non-aqueous electrolyte is in simultaneous contact with the electrodes and the separator and includes a lithium salt dissolved in a non-aqueous electrolyte solvent having the formula:

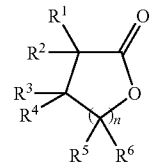

where $R^1$-$R^6$ are independently in each occurrence a hydrogen radical, an aliphatic moiety containing 1 to 5 carbon atoms, or an aromatic moiety containing 6 to 24 carbon atoms; n is an integer between 0 and 4 inclusive with the proviso that when $R^1$-$R^6$ are all hydrogen radicals, n is not 1.

Alternatively, an electrochemical cell includes as a solvent a lactone having a four to eight membered ring to yield a capacity retention for the cell at −40° C. for more than 50% and at 60° C. after 100 cycles more than 90% relative to the cell operation at 25° C. Regardless of the nature of electrolyte lactone solvent, additional secondary solvents are also optionally provided such as a cyclic carbonate, an acyclic carbonate, an acyclic mono-ester, and combinations thereof.

BRIEF DESCRIPTION OF THE DRAWINGS

This invention is further illustrated with reference to the accompanying drawings of exemplary inventive aspects as follows.

DESCRIPTION OF THE PREFERRED EMBODIMENTS

Figure 1:
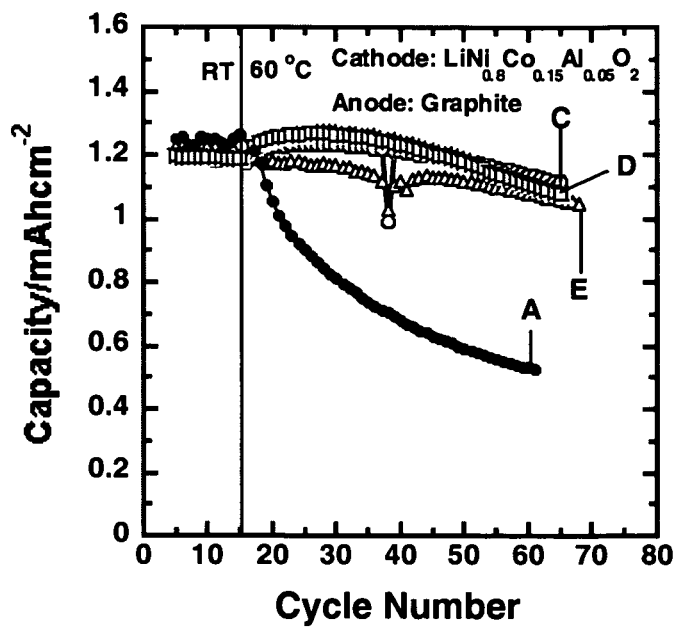
FIG. 1 is a plot of the high temperature (60° C.) cycling performances of lithium ion button cells based on different electrolytes including a thermally stable salt LiBOB and the lactone GBL (electrolytes D and E). The baseline lithium ion cell uses an electrolyte composition (1.0 molar LiPF$_6$/EC: DMC weight ratio 1:1, electrolyte A) that is common in commercial state-of-the-art lithium ion cells. A LiBOB electrolyte without GBL (electrolyte C) is also included for comparison.

The present invention has utility as an electrolyte and an operative battery. An inventive non-aqueous electrolyte rechargeable battery includes an electrode group of a positive electrode and a negative electrode; a separator interposed between the positive and the negative electrodes; and a non-aqueous electrolyte permeating the electrode group and impregnating the separator. The inventive non-aqueous electrolyte includes at least one lithium salt dissolved in one or more non-aqueous solvents.

A positive electrode (synonymously described herein as a cathode) typically is a lithiated metal oxide or mixed metal oxides. Preferably, the lithiated metal oxide or mixed metal oxides has layer or tunnel structures to facilitate lithium ion diffusion within these structures. More preferably, lithiated metal oxide powder is coated as a thin film, with resort to a polymeric binder and other conventional optional conductive additives, onto a metal substrate. Lithiated metal oxide cathode materials operative herein illustratively include LiCoO$_2$, LiNiO$_2$ doped with various amounts of metals, (LiNi$_x$M'$_y$M''$_{(1-x-y)}$O$_2$, where M' and M'' are each independently one of Co, Al and Mn), spinel (LiMn$_2$O$_4$), olivine phosphates (LiMPO$_4$) where M is at least one of Co, Ni, Fe, and Mn, or partially substituted forms thereof; or the mixed metal oxides of the formula Li$_{1-x}$(M$^1_y$M$^2_z$M$^3_{1-y-z}$)O$_2$ (0≤x<1, 0≤y,z<1) where M$^1$, M$^2$, and M$^3$ are each independently one of Co, Ni, Fe, and Mn, or the mixture several of these metals.

A negative electrode (synonymously described herein as an anode) typically is lithium metal or materials that can be lithiated at potentials within +2.0 V of the lithium metal potential. Such anodic materials illustratively include amorphous and ordered carbonaceous materials, Li—Al alloys, Li—Sn alloys, Li—Sn—O alloys, Sn, SnO and SnO$_2$, lithiated TiO$_2$ such as Li$_4$Ti$_5$O$_{12}$ with spinel structure. More preferably, anode powder is coated as a thin film, with the help of a polymeric binder and other conductive additives, onto a metal substrate.

A conventional optional separator is either a porous polymeric film that is impregnated with the non-aqueous electrolyte solutions, or a polymer material able to form a gel with the electrolyte solutions. Separators operative herein illustratively include non-woven polyolefin films, fluorine-containing polymers such as poly(vinylidene fluoride) (PVdF), (hexafluoro propylene) copolymer (PVdF-HFP), polyacrylates, methacrylates, acrylonitriles, and copolymers of styrenes and butadienes, copolymers and polymer blends of the aforementioned polymeric species.

An inventive non-aqueous electrolyte solution includes one or more thermally stable salts, such as stable lithium salts dissolved in a non-aqueous solvent or a mixture of non-aqueous solvents. An electrolyte lithium salt illustratively includes lithium bis(trifluoromethane sulfonyl)imide (LiIm), lithium trifluoromethane sulfonate (LiTf), lithium tetrafluoroborate (LiBF$_4$), lithium bis(oxalato)borate (LiBOB), lithium tris(oxalato)phosphate (LiTOP), and lithium difluoro (oxalato)borate (LiBOF) or combinations thereof. Preferably the thermally stable lithium salt is LiBOB.

The non-aqueous solvent or solvent mixture includes at least one cyclic lactone as defined by the following general structure:

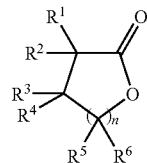

where R$^1$-R$^6$ are independently in each occurrence a hydrogen radical, an aliphatic moiety containing 1 to 5 carbon atoms, or an aromatic moiety containing 6 to 24 carbon atoms, and n is an integer between 0 and 4, inclusive. Cyclic lactones operative herein illustratively include beta-propiolactone (BPL), beta-butyrolactone (BBL), alpha-methyl-gamma-butyrolactone (AMGBL), gamma-butyrolactone (GBL), gamma-valerolactone (GVL), delta-valerolactone (DVL), gamma-caprolactone (GCL), epsilon-caprolactone (ECL), gamma-octanolactone (GOL), gamma-nanolactone (GNL), gamma-decanolactone (GDL), delta-decanolactone (DDL), gamma-undecanolactone (GUL), delta-undecanolactone (DUL), and delta-dodecanolactone (DDDL).

An electrolyte solution including the combination of at least a thermally stable lithium salt and at least a cyclic lactone yields a lithium cell able to deliver stable performances at both low and high temperatures.

The present invention is further illustrated with reference to the following examples, which are for illustrative purpose, but the spirit of the present invention is by no way limited by these examples. To help the illustration of the examples, a number of electrolytes as designated by letters A, B, C, etc. with different salt-solvent combinations are used as shown in Table 1.

TABLE 1

Model Electrolytes

| Electrolyte Designation | Lithium Salt (mols/liter) | Solvent (ratios on weight basis) |
|---|---|---|
| A (baseline) | 1M lithium hexafluoro phosphate | 1:1 ethylene carbonate (EC):dimethyl carbonate (DMC) |
| B (baseline) | 1M lithium hexafluoro phosphate | 1:1:3 EC:propylene carbonate (PC):ethylmethyl carbonate (EMC) |
| C (high temperature stable salt, conventional solvent) | 1M lithium bis(oxalato) borate (LiBOB) | 1:1 EC:(EMC or DMC) |
| D | 1M LiBOB | 3:3:4 EC:gamma butyrolactone (GBL):(EMC or DMC) |
| E | 1M LiBOB | 1:1:3 EC:GBL:(EMC or DMC) |
| F | 1M LiBOB | GBL |

TABLE 1-continued

Model Electrolytes

| Electrolyte Designation | Lithium Salt (mols/liter) | Solvent (ratios on weight basis) |
|---|---|---|
| G | 1M LiBOB | 3:3:4 EC:gamma valerolactone (GVL):(EMC or DMC) |
| H | 1M LiBOB | 1:1:3 EC:GVL:(EMC or DMC) |
| I | 1M LiBOB | 3:3:4 EC:epsilon caprolactone (ECL):(EMC or DMC) |
| J | 1M LiBOB | 1:1:3 EC:ECL:(EMC or DMC) |
| K | 1M LiBOB | 3:3:4 EC:gamma caprolactone (GCL):(EMC or DMC) |
| L | 1M LiBOB | 1:1:3 EC:GCL:(EMC or DMC) |
| M | 1M LiBOB | 3:3:4 EC:delta valerolactone (DVL):(EMC or DMC) |
| N | 1M LiBOB | 1:1:3 EC:DVL:(EMC or DMC) |

Example 1

Electrolyte solutions of 1.0 molar $LiPF_6$ or LiBOB in various solvents are made in a glove-box by mixing with the solvents of Table 1. LiBOB-containing solutions are clear after heating up in an oven of 80° C., while baseline electrolytes are shaken at 25° C. until clear solutions were obtained.

A piece of cathode based on doped $LiNiO_2$, a piece of anode based on graphite, and a piece of polypropylene separator are assembled into coin cells using Al-clad stainless steel CR 2032 hardwares. After being filled with the prepared electrolyte solutions, the cells are closed by crimping the cap against a polypropylene O-ring placed between the cell cap and the container. The cells then are subject to galvanostatic cyclings at room temperature (25° C.).

Following ~15 cycles at room temperature, the cells designated for high temperature test are moved into a Tenney engineering oven set at 60° C. The baseline electrolyte used in these high temperature tests is electrolyte A. The cells are cycled at C/3 constant current in the oven. As shown in FIG. 1, the rechargeable lithium ion cell including baseline electrolyte A shows a rapid rate of capacity loss, while all the LiBOB-containing electrolytes C, D and E show a more stable performance at 60° C. The two electrolytes D and E that include both LiBOB and GBL show similar stable performance at 60° C. as compared to the GBL-free electrolyte C despite the different percentages of lactone (30% for electrolyte D and 20% for E). Table 2 tabulated these results shown in FIG. 1 by comparing the percentage of nominal capacity still maintained after 50 or 100 cycles at 60° C. The presence of the thermally stable salt LiBOB in the electrolyte solutions bestows stable performance at high temperatures to the rechargeable lithium ion cells.

TABLE 2

Button Cell High Temperature Test

| Electrolytes | Capacity Retention at 60° C. | |
|---|---|---|
| | at 50 cycles | at 100 cycles |
| A | 46.7 | 30.4 |
| C | 97.5 | 88.0 |
| D | 98.0 | 86.0 |
| E | 92.5 | 86.0 |

Figure 2:
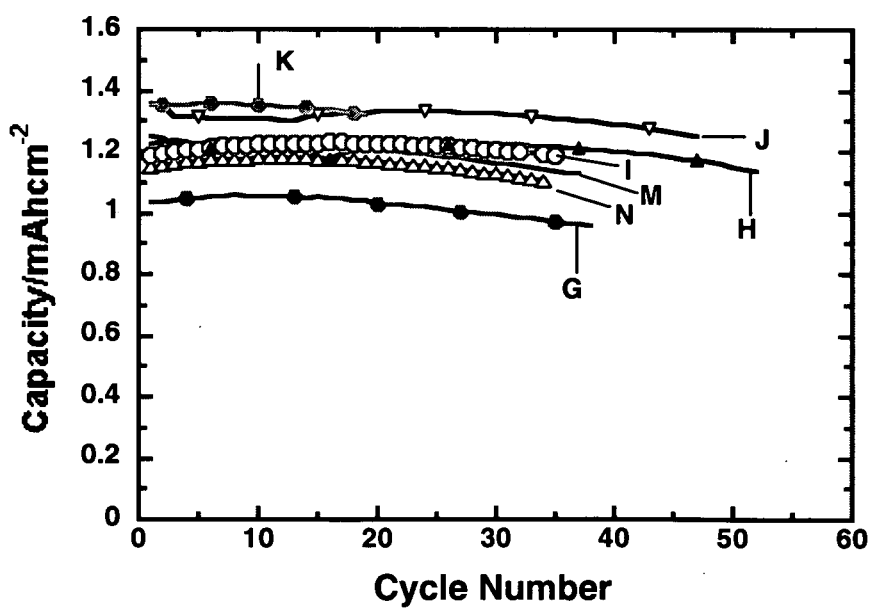
FIG. 2 is a plot of the high temperature (60° C.) cycling performances of lithium ion button cells based on electrolytes G, H, I, J, K, M and N.

The high temperature (60° C.) performance of the lithium ion cells based on electrolytes containing LiBOB and a variety of lactones is demonstrated in FIG. 2. Similar performance is obtained when LiBOB and other lactones are present in an electrolyte.

Example 2

Figure 3:
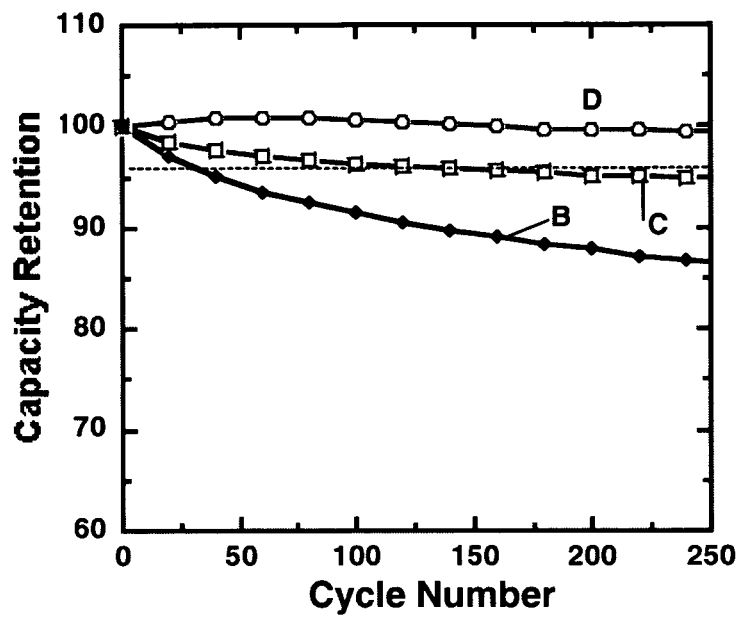
FIG. 3 is a plot of the high temperature (75° C.) cycling performances of the electrolytes C and D of FIG. 1 in state-of-the-art industrial 8 ampere hour (Ah) lithium ion cells, which were hermetically sealed in steel cans and which use LiNiO$_2$-based cathodes. The baseline lithium ion cells used 1.0 molar LiPF$_6$/EC:PC:DMC in a weight ratio 1:1:3 (electrolyte B).

To further confirm the thermal stability of the electrolytes of this invention, the various inventive and baseline electrolytes as described in Example 1 are used to fill the state-of-the-art industrial lithium ion cells that use $LiNiO_2$-based cathode and graphitic carbon anode. FIG. 3 shows the cycling performance of an electrolyte D cell at 75° C. Extended cycling is conducted in order to test the durability of the thermal stability. As a comparison, baseline electrolyte B, and electrolyte C are also included. Table 3 tabulated the results shown in FIG. 3 by comparing the percentage of nominal capacity retained after certain cycles at 75° C. Inventive electrolyte D outperforms electrolyte B-C compositions in the heated environment for long term.

TABLE 3

Industry Cell High Temperature Test

| Electrolytes | Capacity Retention at 75° C. | |
|---|---|---|
| | at $100^{th}$ cycle | at $200^{th}$ cycle |
| B | 91.6 | 88.5 |
| C | 96.1 | 94.8 |
| D | 100 | 99.03 |

Example 3

The cells containing various inventive and baseline electrolytes as assembled in Example 1 are charged to fully charged state (OCV 4.1 V) and then moved into Tenney engineering oven set at different low temperatures ranging from 0 through −40° C. The cells are kept in the oven for at least three hours to achieve the thermal equilibrium, and then are discharged at C/3. The baseline electrolyte used in these low temperature tests is electrolyte B, which is generally considered as suitable for low temperature applications. Table 4 tabulated these results by comparing the percentages of capacity maintained at different temperatures for the cells comprising electrolytes B, C, D, E and F.

The cells containing the thermally stable salt LiBOB and lactone-free solvents (electrolyte C) showed poor performances when the temperature is below −20° C. The presence of a cyclic lactone in the electrolyte solutions improves the performance of the lithium ion cells as shown by electrolytes D and E in Table 4.

FIGS. 1, 2; and Tables 2, 3 and 4 collectively demonstrate that the coexistence of LiBOB salt and a cyclic lactone containing non-aqueous solution deliver stable cell performance at both high and low extreme temperatures.

TABLE 4

Button Cell Low Temperature Test

| | Electrolytes | B | C | D | E | F |
|---|---|---|---|---|---|---|
| Capacity Retention | C(0° C.)/C(25° C.) | 100 | 100 | 100 | 100 | 100 |
| | C(−10° C.)/C(25° C.) | 100 | 95 | 95 | 100 | 100 |
| | C(−20° C.)/C(25° C.) | 86 | 75 | 92 | 88 | 100 |
| | C(−30° C.)/C(25° C.) | 82 | 64 | 83 | 79 | 84 |
| | C(−40° C.)/C(25° C.) | | 18 | 38 | 55 | 23 |

Example 4

Figure 4:
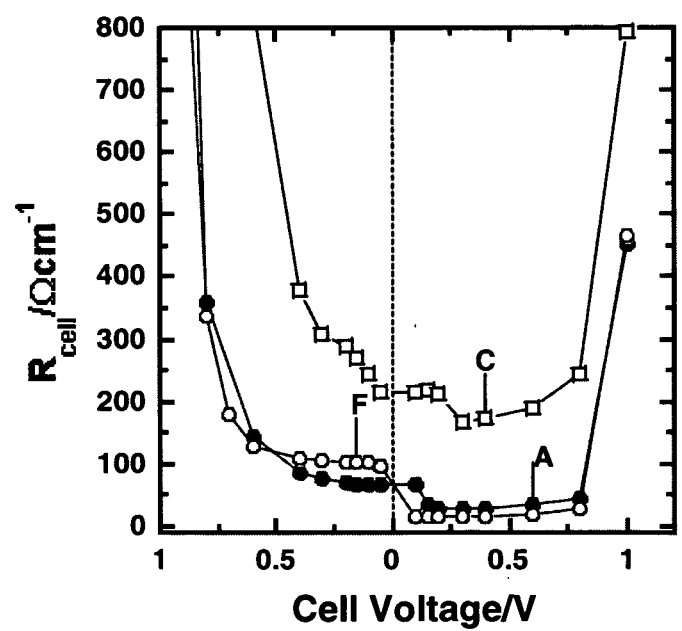
FIG. 4 is a plot of the cell voltage-dependence of the overall impedance of lithium ion cells for electrolytes A and C and 1 molar LiBOB in GBL (electrolyte F).

Half anode cells are assembled per Example 1, except that the cathode piece is replaced by a piece of metallic lithium. While these half anode cells containing electrolytes A, C and F are cycled at C/10 between 0.01 V and 1.0 V, the total cell impedance for each cell is measured as the function of the cell potential. FIG. 4 shows the comparison between the overall cell impedances for these cells. The presence of a cyclic lactone GBL in the electrolyte solution reduces the cell impedance to a level that is close to the cell impedance of the baseline electrolyte A. Thus, FIG. 4 confirms that the combination of a thermally stable salt and a cyclic lactone in an electrolyte solution effectively reduces the cell impedances, leading to better power performance and better capacity retentions at low temperatures.

Example 5

Additional electrolytes containing a thermally stable lithium salt other than LiBOB, namely LiIm, LiTf, LiBOF and LiTOP, are prepared per Example 1. The cells containing these electrolytes are subjected to cycling tests at high temperatures as high as 80° C. and low temperature discharge tests as low as −60° C. The results corroborate the conclusions drawn in Examples 1-3.

Example 6

Electrolytes containing multiple thermally stable lithium salts from among LiBOB, LiIm, TiTf, LiBOF, and LiTOP dissolved in solvent mixtures containing as a solvent only one or more cyclic lactones BPL, BBL, AMGBL, GBL, GVL, DVL, GCL, ECL, GOL, GNL, GDL, DDL, GUL, DUL, and DDDL are prepared as analogs to electrolyte F per Example 1. The cells are subjected to cycling tests at high temperatures as high as 80° C. and low temperature discharge tests as low as −60° C. The results corroborate the teachings shown in Examples 1-3.

Example 7

Electrolytes containing one or more thermally stable lithium salts dissolved in solvent mixtures containing one or more than one cyclic lactone, and one or more than one cyclic and acyclic carbonates, are prepared per Example 1. The lithium salts are selected from LiBOB, LiIm, LiTf, LiBOF, and LiTOP, and the total salt concentration in the electrolyte solutions ranges from 0.5 to 1.2 molar; the cyclic lactones are chosen from BPL, BBL, AMGBL, GBL, GVL, DVL, GCL, ECL, GOL, GNL, GDL, DDL, GUL, GUL, and DDDL with a total lactone weight percentage in the electrolyte solvent mixtures between 5 and 100%; the cyclic carbonates are chosen from EC, PC, trifluoromethyl carbonate (TFMC), fluoroethylene carbonate (FEC), chloroethylene carbonate (ClEC), butylene carbonate (BC), dimethyl ethylene carbonate (DMEC) with a total cyclic carbonate weight percentage in the electrolyte solvent mixtures between 5 and 95%; the acyclic carbonates are chosen from DMC, diethyl carbonate (DEC), EMC, isopropyl methyl carbonate (MiPC) with a total acyclic carbonate weight percentage in the electrolyte solvent mixture range between 20-80%. The cells are subjected to cycling tests at high temperatures as high as 80° C. and low temperature discharge tests as low as −60° C. The results corroborate the conclusions drawn in Examples 1-3.

From the results obtained from Examples 1-7 it is noted that the capacity retention of rechargeable lithium ion cells at both high and low temperatures is improved by using the electrolyte formulations of this invention. Moreover, only when both the thermally stable lithium salt and the lactone are present in the electrolyte solution can the said benefits be realized.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

It is understood that various other modifications will be apparent to and can be readily made by those skilled in the art without departing from the scope and spirit of this invention. Accordingly, it is not intended that the scope of the claims appended hereto be limited to description as set forth herein, but rather that the claims be construed as encompassing all the features of patentable novelty that reside in the patent invention, including all features that would be treated as equivalents thereof by those skilled in the art to which this invention pertains.

The invention claimed is:

1. A non-aqueous rechargeable electrochemical cell comprising:
    a positive electrode;
    a negative electrode;
    a separator interposed between said positive electrode and said negative electrode; and
    a non-aqueous electrolyte in simultaneous contact with said positive electrode, said negative electrode and said separator,
    said electrolyte consisting essentially of:
        a lithium salt of bis(oxalato)borate (LiBOB) dissolved in an at least 50 weight percent gamma-butyrolactone and an at least 5 weight percent but less than 50 weight percent of a non-aqueous lactone solvent selected from the group consisting of: beta-propiolactone, beta-butyrolactone, alpha-methyl-gamma-butyrolactone, gamma-valerolactone, delta-valerolactone, gamma-caprolactone, epsilon-caprolactone, gamma-octanolactone, gamma-nanolactone, gamma-decanolactone, delta-decanolactone, gamma-undecanolactone, delta-undecanolactone, and delta-dodecanolactone, whose structure can be represented by the general formula:

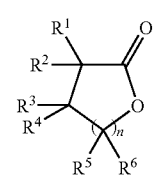

(I)

where $R^1$-$R^6$ are independently in each occurrence a hydrogen radical;
an aliphatic moiety containing 1 to 5 carbon atoms, or an aromatic moiety containing 6 to 24 carbon atoms;
n is an integer between 0 and 4 inclusive with the proviso
when all $R^1$-$R^6$ are hydrogen radicals, n is not 1 and a second solvent component limited to 5 to 45 weight percent of the compounds selected from any other lactone solvents each weight less the weight of said lithium salt.

2. The cell of claim 1 wherein said positive electrode is formed of a material selected from the group consisting of a phosphate of an olivine structure with the formula of $LiMPO_4$ where M is at least one of Co, Ni, Fe, and Mn, or a layered or spinel structured mixed metal oxide of the formula $Li_{1-x}(M^1_y M^2_z M^3_{1-y-z})O_2$ ($0 \leq x<1$, $0 \leq y,z<1$) where $M^1$, $M^2$, and $M^3$ are each independently one of Co, Ni, Fe, and Mn, or metal oxides.

3. The cell of claim 1 wherein said negative electrode includes intercalation materials, alkaline or non-alkaline metal or metal alloys, all of which operate within 0 to 2.0 V to that of metallic lithium.

4. The cell of claim 1 wherein said separator is a polymer that can form a gel with said electrolyte, or porous polymer whose porosity can be impregnated with the said electrolyte.

5. The cell of claim 1 wherein said cell has a capacity retention at 40° C. more than 50% and after 100 cycles at 60° C. more than 90% relative to said cell operation at 25° C.

6. The cell of claim 5 wherein said cell has a capacity retention at −40° C. more than 50% and after 100 cycles at 60° C. more than 90% relative to said cell operation at 25° C.

7. The cell of claim 5 wherein said cell has a capacity retention at −40° C. more than 50% and after 100 cycles at 60° C. more than 90% relative to said cell operation at 25° C.

8. A non-aqueous rechargeable electrochemical cell according to claim 1 further comprising
   a non-aqueous electrolyte in simultaneous contact with said positive electrode, said negative electrode and said separator, said electrolyte comprising a lactone having a four to eight membered ring to yield a capacity retention at −40° C. more than 50% and after 100 cycles at 60° C. more than 90% relative to said cell operation at 25° C.

9. The cell of claim 8 wherein said electrolyte further comprises lithium difluoro(oxalato)borate.

10. The cell of claim 8 wherein said electrolyte further comprises a lithium salt is selected from the group consisting of: lithium bis(trifluoromethane sulfonyl)imide, lithium trifluoromethane sulfonate, lithium tetrafluoroborate, lithium bis(oxalato)borate, and lithium tris(oxalato)phosphate.

11. The cell of claim 8 wherein said non-aqueous electrolyte solvent further comprises a cyclic carbonate.

12. The cell of claim 8 wherein said non-aqueous electrolyte solvent further comprises an acyclic carbonate.

13. The cell of claim 8 wherein said non-aqueous electrolyte solvent further comprises an acyclic mono-ester.

14. The cell of claim 8 wherein said non-aqueous electrolyte solvent further comprises:
   a cyclic carbonate present from 5 to 95 weight percent of said electrolyte less said lithium salt;
   an acyclic carbonate present from 20 to 80 weight percent of said electrolyte less said lithium salt;
   an acyclic mono-ester present from 20 to 80 weight percent of said electrolyte less said lithium salt;
   wherein said solvent of Formula I is present at greater than or equal to 5 weight percent of said electrolyte less said lithium salt.

15. The cell of claim 8 wherein said lactone is selected from the group consisting of: beta-propiolactone, beta-butyrolactone, alpha-methyl-gamma-butyrolactone, gamma-butyrolactone, gamma-valerolactone, delta-valerolactone, gamma-caprolactone, epsilon-caprolactone, gamma-octanolactone, gamma-nanolactone, gamma-decanolactone, delta-decanolactone, gamma-undecanolactone, delta-undecanolactone, and delta-dodecanolactone.

* * * * *